(12) United States Patent
Hammersberg et al.

(10) Patent No.: US 11,995,911 B2
(45) Date of Patent: May 28, 2024

(54) BIOMETRIC IMAGING DEVICE COMPRISING POLARIZERS

(71) Applicant: FINGERPRINT CARDS ANACATUM IP AB, Gothenburg (SE)

(72) Inventors: Johan Hammersberg, Floda (SE); Arvid Hammar, Gothenburg (SE)

(73) Assignee: FINGERPRINT CARDS IP AB, Gothenburg (SE)

( * ) Notice: Subject to any disclaimer, the term of this patent is extended or adjusted under 35 U.S.C. 154(b) by 0 days.

(21) Appl. No.: 18/260,508

(22) PCT Filed: Feb. 3, 2022

(86) PCT No.: PCT/SE2022/050117
§ 371 (c)(1),
(2) Date: Jul. 6, 2023

(87) PCT Pub. No.: WO2022/169397
PCT Pub. Date: Aug. 11, 2022

(65) Prior Publication Data
US 2024/0021010 A1    Jan. 18, 2024

(30) Foreign Application Priority Data

Feb. 4, 2021   (SE) .................................. 2150131-7

(51) Int. Cl.
*G06V 40/13* (2022.01)
*G02B 5/20* (2006.01)
(Continued)

(52) U.S. Cl.
CPC ......... *G06V 40/1318* (2022.01); *G02B 5/208* (2013.01); *G02B 27/281* (2013.01); *G02B 27/288* (2013.01); *G06V 10/14* (2022.01)

(58) Field of Classification Search
CPC ............... G06V 40/1318; G06V 10/14; G06V 40/1324; G06V 10/147;
(Continued)

(56) References Cited

U.S. PATENT DOCUMENTS

| 6,118,476 A | 9/2000 | Morito et al. |
| 2017/0052430 A1* | 2/2017 | Higashitsutsumi .. G01B 11/303 |

(Continued)

FOREIGN PATENT DOCUMENTS

| CN | 211454620 U | 9/2020 |
| CN | 112036325 A | 12/2020 |

(Continued)

OTHER PUBLICATIONS

International Search Report and Written Opinion for International Application No. PCT/SE2022/050117, dated Mar. 10, 2022.
(Continued)

*Primary Examiner* — Premal R Patel
(74) *Attorney, Agent, or Firm* — Westman, Champlin & Koehler, P.A.

(57) ABSTRACT

An optical biometric imaging device includes an image sensor having a plurality of photodetector pixels; a lens assembly having at least one lens configured to focus light reflected by a biometric object onto the image sensor; at least one light source arranged adjacent to the lens assembly and which emits light towards a sensing surface of the biometric imaging device. The at least one light source comprises a waveguide which vertical decouples light; a first linear polarizer arranged between the light source and the image sensor; and a ring-shaped second linear polarizer arranged over the light source to polarize light emitted by the light source in a direction away from the image sensor and having an opening which allows light reflected by a biometric
(Continued)

object to reach the lens without being filtered by the second linear polarizer. At least one of the polarizers are rotatable.

17 Claims, 8 Drawing Sheets

(51) Int. Cl.
*G02B 27/28* (2006.01)
*G06V 10/14* (2022.01)

(58) Field of Classification Search
CPC .......... G06V 40/12–1394; G02B 5/208; G02B 27/281; G02B 27/288; G02B 5/0278; G02B 5/3033
See application file for complete search history.

(56) References Cited

U.S. PATENT DOCUMENTS

| | | |
|---|---|---|
| 2018/0114080 A1 | 4/2018 | Maeda et al. |
| 2018/0121703 A1 | 5/2018 | Jung et al. |
| 2019/0026527 A1* | 1/2019 | He .................. G02B 6/0026 |
| 2020/0050829 A1 | 2/2020 | Akcasu |
| 2020/0134283 A1* | 4/2020 | Qing ............... G06V 40/1318 |
| 2020/0401269 A1* | 12/2020 | Reynolds .......... G06V 40/1359 |
| 2021/0248345 A1 | 8/2021 | Wu et al. |
| 2022/0067325 A1* | 3/2022 | Hsu ................. G06V 40/1324 |

FOREIGN PATENT DOCUMENTS

| | | |
|---|---|---|
| JP | H11109451 A | 4/1999 |
| JP | 2018054818 A | 4/2018 |
| WO | 2014041818 A1 | 3/2014 |
| WO | 2014123241 A1 | 8/2014 |
| WO | 2020088129 A1 | 5/2020 |

OTHER PUBLICATIONS

M. McLamb, Y. et al., "Diffraction Gratings for Uniform Light Extraction from Light Guides," 2019 IEEE 16th International Conference on Smart Cities: Improving Quality of Life Using ICT & IOT and AI (HONET-ICT), 2019, pp. 220-222, doi: 10.1109/HONET.2019.8908123.

* cited by examiner

BIOMETRIC IMAGING DEVICE COMPRISING POLARIZERS

CROSS-REFERENCE TO RELATED APPLICATION

This Application is a Section 371 National Stage Application of International Application No. PCT/SE2022/050117, filed Feb. 3, 2022, which claims priority to Swedish Patent Application No. 2150131-7 filed on Feb. 4, 2021, and published as WO 2022/169397 A1 on Aug. 11, 2022, in English, the entire contents of which are hereby incorporated by reference in their entireties.

FIELD OF THE INVENTION

The present invention relates to an optical biometric imaging device suitable for integration in a display panel. In particular, the invention relates to an optical biometric imaging device suitable for fingerprint sensing.

BACKGROUND OF THE INVENTION

Biometric imaging systems are widely used as means for increasing the convenience and security of personal electronic devices, such as mobile phones, tablet computers, laptops etc. Fingerprint sensing systems in particular are now included in a large proportion of all newly released consumer electronic devices.

Optical fingerprint sensors have been known for some time and may be a feasible alternative to e.g. capacitive fingerprint sensors in certain applications such as for use as under-display sensors in smartphones, tablet computers, presentation screens, access systems and the like. Optical fingerprint sensors may for example be based on the pinhole imaging principle and/or may employ micro-structures, e.g. collimators or microlenses to collect and steer incoming light towards an image sensor.

As the technological development progresses for e.g. OLED touch panel displays, new display models with increased resolution (i.e. LED pixel density) are constantly introduced to the market.

For an optical fingerprint sensor arranged under a display, it is often required that the finger is illuminated so that a sufficient amount of light is reflected by the finger to subsequently reach the fingerprint sensor. In an under-display sensor arrangement, the display pixels are often used to illuminate the finger during fingerprint image acquisition. Illumination of the finger can be achieved by controlling the brightness of the display as a whole to illuminate the finger, or more specifically, to flash or to otherwise increase the illumination of the finger at the location of the finger. However, light emitted within the device, such as by a display panel, may also be reflected by various layers in the device and reach the image sensor to thereby disturb the capture of a fingerprint image.

Accordingly, it is desirable to provide solutions addressing issues arising from internal reflections in a display panel and which may also improve image capture.

SUMMARY

In view of above-mentioned and other drawbacks of the prior art, it is an object of the present invention to provide an improved biometric imaging device suitable for use under a display cover glass in an electronic user device.

According to a first aspect of the invention, there is provided an optical biometric imaging device for imaging a biometric object. The imaging device comprises: an image sensor comprising a plurality of photodetector pixels; a lens assembly comprising at least one lens configured to focus light reflected by a biometric object onto the image sensor; at least one light source arranged adjacent to the lens assembly and configured to emit light towards a sensing surface of the biometric imaging device, wherein the at least one light source comprises a waveguide configured to provide vertical decoupling of light; a first linear polarizer arranged between the light source and the image sensor; and a ring-shaped second linear polarizer arranged over the at least one light source to polarize light emitted by the light source in a direction away from the image sensor and having an opening configured to allow light reflected by a biometric object to reach the lens without being filtered by the second linear polarizer, polarizer, wherein at least one of the first and second polarizer is rotatable.

In the present context, the lens assembly may comprise a single lens or a plurality of vertically aligned, coaxial, lenses to provide biometric imaging by a camera-type optical imaging device. The at least one light source is arranged adjacent to and in the vicinity of the lens assembly. In practice, it is desirable to arrange the light source as close to the lens assembly as possible to improve illumination of the object to be imaged and to reduce internal reflections of the emitted light.

For a biometric imaging device such as a fingerprint sensor arranged under e.g. a display panel, it may be advantageous to provide additional light sources to not have to rely on illumination from the display panel. In the claimed invention, a biometric imaging device is provided where at least one light source is arranged adjacent to a lens assembly such that the finger can be illuminated by the light source. Thereby, improved fingerprint imaging can be achieved since the light source can be controlled directly by the fingerprint sensor and does not have to rely on the display panel, which also brings the advantage that the imaging device does not need to be able to control the functionality of the display and can instead operate independently.

Furthermore, when a light source is placed under a display panel it is desirable to ensure that light emitted by the light source is not reflected by the display panel back towards the image sensor. In view of this, the present invention is based on the realization that reflections can be avoided by a ring-shaped second polarizer which polarizes the light emitted by the light source, but which lets reflected light pass through the opening of the ring. Moreover, by arranging at least one of the first and second polarizer to be rotatable, the relation between the polarization direction of the two polarizers can be adjusted so that reflections are minimized, and so that the optical performance of the imaging device can be optimized for a given application.

The waveguide may comprise a vertical diffuser, or a grating for decoupling light from the waveguide to be emitted in a direction towards a sensing surface of the biometric imaging device. When using a waveguide with vertical decoupling the light source may be one or more LEDs or a suitable semiconductor laser. A laser may be used if it is desirable to improve the control of the wavelength of emitted light, for example to better match the properties of a grating.

The waveguide may advantageously be a circular waveguide arranged around the lens assembly, thereby providing uniform illumination around the lens. Moreover, the waveguide may guide the infrared light through total internal reflection. Optical decoupling areas of the waveguide may be configured to decouple the infrared light from the total internal reflection guiding and orthogonally out from the waveguide structure, in a direction orthogonal from a main plane of the waveguide structure having its main extension in the main plane.

According to one embodiment of the invention, the ring-shaped second linear polarizer has an opening having a size corresponding to a size of the at least one lens. Thereby, all of the reflected light reaching the lens pass through the opening of the second polarizer without any change in polarization, and only light emitted by the light source is polarized by the second polarizer which improves the suppression of unwanted reflections.

According to one embodiment of the invention, the first linear polarizer is arranged to have polarization direction substantially perpendicular to a polarization direction of the second linear polarizer. This has the effect that light emitted by the light source and which has passed through the second linear polarizer will be blocked by the first linear polarizer, unless there has been in change in polarization of the emitted light along the path from the second to the first polarizer. This means the unwanted reflections of emitted light can be prevented from reaching the image sensor, or at least that the amount of unwanted reflections reaching the image sensor is decreased.

According to one embodiment of the invention, the first linear polarizer is arranged between the lens and the image sensor. Thereby, light reaching the first linear polarizer will have passed through the lens before reaching the polarizer.

According to one embodiment of the invention the first linear polarizer may be arranged between the lens and the second linear polarizer, wherein the at least one light source is arranged so that light emitted in a direction away from the image sensor does not pass through the first linear polarizer.

According to one embodiment of the invention the light source is configured to emit light in the infrared wavelength range. By using an infrared light source, such as an IR-LED, biometric imaging can be performed without the user noticing the light from the light source. If a light source using visible light is used, or if a display panel is used to illuminate a finger with visible light, the user may see a flashing light during image capture. In daylight conditions, the light may not be noticeable by or disturbing to a user, but in low-light or dark surroundings such a flashing light might irritate and disturb a user. Accordingly, using of a light source emitting infrared light, the user experience can be improved.

According to one embodiment of the invention, the optical biometric imaging device may comprise a filter configured to block visible light, the filter being arranged between a sensing surface of the imaging device and the image sensor. If infrared light is used to illuminate the finger, it is desirable to reduce the amount of light reaching the image sensor and this can be achieved by providing an optical filter configured to block visible light. Such a filter may for example be integrated with the first linear polarizer by laminating an optical filter to the polarizing filter.

According to one embodiment of the invention the at least one light source comprises a plurality of light emitting diodes, LEDs, and the LED may for example arranged in a ring around the lens assembly. By arranging LED uniformly around the lens, uniform illumination of an object to be imaged can be achieved. However, it may also be possible to achieve adequate illumination by arranging LEDs in groups or rows adjacent to the lens. Moreover, various optical elements may be used to improve the illumination of a biometric object at the sensing surface.

According to one embodiment of the invention, the at least one light source comprises a ring-shaped light source. A ring shaped light source may for example be provided in combination with a ring-shaped waveguide to provide even and illumination of a finger.

According to one embodiment of the invention, the lens assembly may comprise a circular lens arranged in a lens barrel. The lens barrel acts as a holder to one or more lens elements, and it is also possible to arrange the light source and the first polarizer and/or the ring-shaped second polarizer on the lens barrel. Thereby, the lens, lens barrel, polarizers and light source can be provided as a single module to be placed on the substrate comprising the image sensor.

According to one embodiment of the invention, the biometric imaging device is integrated in a display arrangement further comprising in order from the biometric imaging device: a display panel; a quarter wave plate; a linear polarizer, and a cover-glass. The quarter wave plate acts to circularly polarize light passing through, and by means of the linear polarizer and quarter wave plate, internal reflections in the display arrangement can be reduced. The display panel may for example be an OLED display panel.

According to a second aspect of the invention, there is provided an optical biometric imaging device for imaging a biometric object. The optical biometric imaging device comprising: an image sensor comprising a plurality of photodetector pixels; a lens assembly comprising at least one lens configured to focus light reflected by a biometric object onto the image sensor; a ring-shaped light source comprising a waveguide configured to provide vertical decoupling of light arranged around the lens assembly and configured to emit light towards a sensing surface of the biometric imaging device; a first linear polarizer arranged between the light source and the image sensor; and a ring-shaped second linear polarizer arranged over the at least one light source to polarize light emitted by the light source in a direction away from the image sensor and having an opening configured to allow light reflected by a biometric object to reach the lens without being filtered by the second linear polarizer, wherein the first linear polarizer is arranged to have a polarization direction substantially perpendicular to a polarization direction of the second linear polarizer.

By means of the ring-shaped light source arranged around a circular lens, improved illumination of a biometric object such as a finger can be achieved. Moreover, by means of the first linear polarizer being arranged to have a polarization direction which is substantially perpendicular to the ring-shaped second polarizer, direct reflections of light originating from the ring-shaped light source can be prevented from reaching the image sensor, thereby improving the imaging quality.

Effects and features of this second aspect of the present invention are largely analogous to those described above in connection with the first aspect of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging system according to the present invention are mainly described with reference to a fingerprint imaging sensor suitable for use under a display panel of a consumer device such as a smartphone, tablet computer and the like. However, other implementations of the imaging device are also possible. It should be noted that the illustrated components are not drawn to scale, and that the illustrations serve to schematically illustrate the features of the claimed invention.

Figure 1:
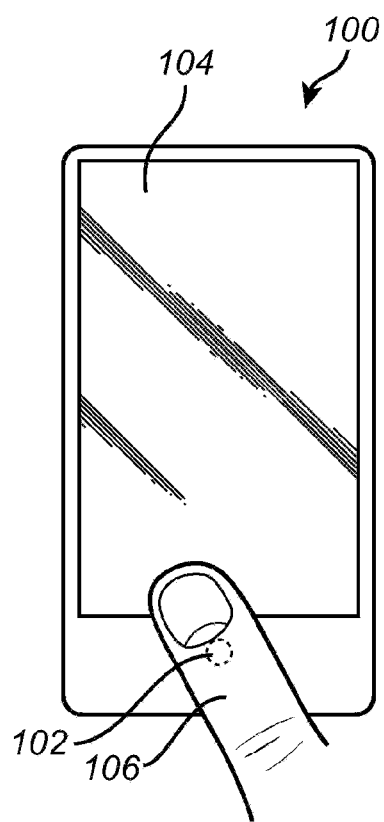
FIG. 1 schematically illustrates a smartphone comprising an optical biometric imaging device according to an embodiment of the invention.

FIG. 1 schematically illustrates a smartphone 100 comprising an optical biometric imaging device 102 located under a display panel 104 of the smartphone 100. In particular, the biometric imaging device 102 is located under an active display area of the display panel 104. The biometric imaging device 102 is arranged to capture an image of a finger 106 placed on the display panel. In the following description, a device comprising one biometric imaging device 102 will be described. However, it would equally well be possible to arrange a plurality of imaging devices under the display panel 104 so as to enable fingerprint imaging over a larger area portion of the display panel 104. Moreover, the biometric imaging device 102 may also capture palmprints.

Figure 2A:
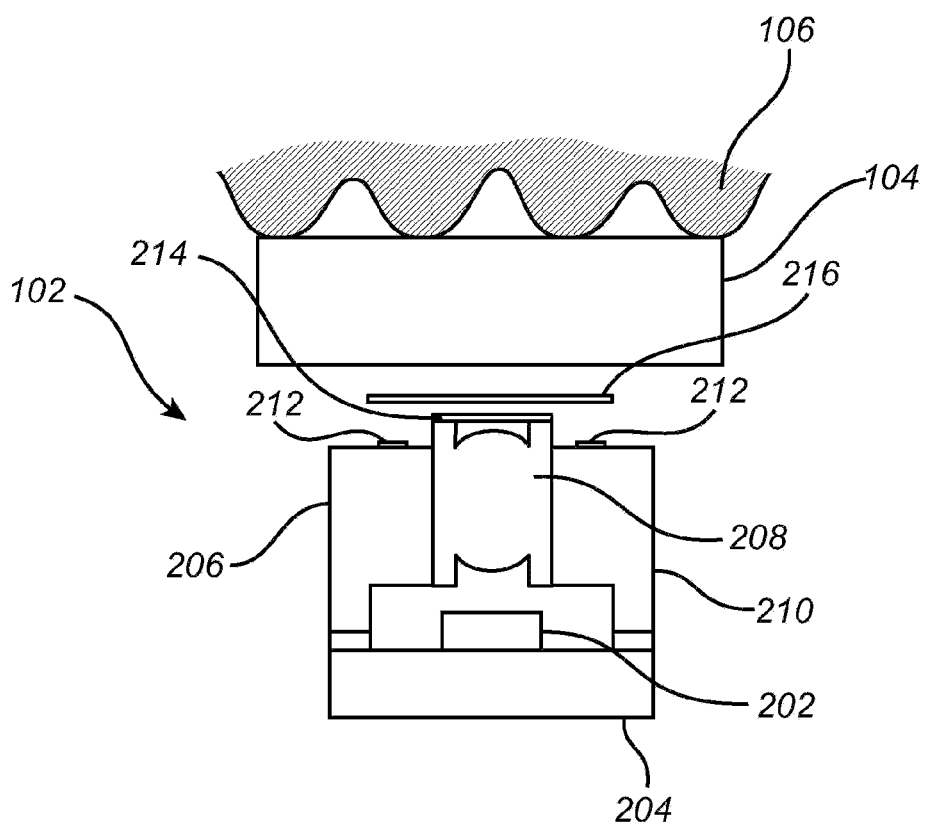
FIGS. 2A-C schematically illustrates an optical biometric imaging device and details of such an imaging device according to an embodiment of the invention.
Figure 2B:
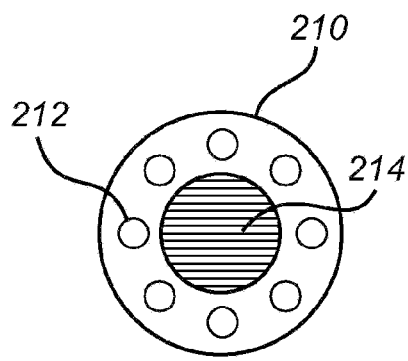
Figure 2C:
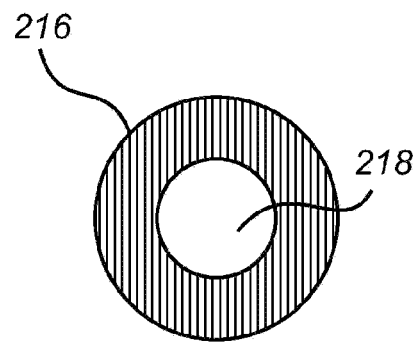

FIG. 2A schematically illustrates a cross section of an optical biometric imaging device 102 according to an embodiment of the invention and FIGS. 2B-C illustrate a top view of specific elements of the optical biometric imaging device 102. The optical biometric imaging device 102 comprises an image sensor 202 arranged on a substrate 204 and a lens assembly 206 which is here illustrated to comprise a single lens 208 configured to focus light reflected by the finger 106 onto the image sensor 202, the lens being arranged in a lens barrel 210. The optical biometric imaging device 102 is arranged under a display panel 104 so that an image of a fingerprint from a finger 106 placed on the outer surface the display panel 104 can be obtained. The imaging device 102 further comprises at least one light source 212 arranged adjacent to the lens assembly and configured to emit light towards a sensing surface of the biometric imaging device and to illuminate a finger 106 placed on the sensing surface.

The optical biometric imaging device 102 further comprises a first linear polarizer 214 arranged between the light source 212 and the image sensor 202 and a ring-shaped second linear polarizer 216 arranged over the at least one light source 212. The first and second linear polarizers 214, 216 are polarizing filters configured to only allow light having the polarization of the filter to pass. The ring-shaped second linear polarizer 216 is arranged to polarize light emitted by the light source 212 in a direction away from the image sensor, i.e. to polarize light emitted towards a sensing surface 220 of the biometric imaging device 102. The ring-shaped second linear polarizer 216 can also be described as an annulus having an opening 218 configured to allow light reflected by a biometric object such as a finger 106 to reach the lens 208 without being filtered by the ring-shaped second linear polarizer 216.

That the first linear polarizer 214 is arranged between the light source 212 and the image sensor 202 means that light emitted by the light source 212 pass through the first linear polarizer 214 before reaching the image sensor. In other words, the first linear polarizer 214 is arranged in the light path from the light source 212 to the image sensor 202 so that light from the light source 212 reaching the image sensor 202 has been polarized once by the second linear polarizer and once by the first linear polarizer 214.

Moreover, at least one of the first linear polarizer 214 and the second ring-shaped linear polarizer 216 is rotatable so that the relative polarization orientation of the two linear polarizers 214, 216 can be adjusted. By rotating one or both of the two polarizers, the resulting image properties of an image captured by the image sensor 202 can be optimized for a given implementation. This rotatability of the polarizers is advantageous since light propagation and polarization properties are dependent on the layers of the display through which the emitted light will pass on its way towards a biometric object and back towards the image sensor 202. The described imaging device 102 is thereby suitable for use in different implementations, such as underneath different displays.

FIG. 2B is a top view showing a lens holder 210 which may be a lens barrel configured to hold a circular lens, a plurality of light sources 212 in the form of light emitting diodes arranged in a ring formation on the lens holder 210 and the first linear polarizer 214. FIG. 2C is a top view illustrating the ring-shaped second linear polarizer 216 having a central opening 218. The first and second linear polarizers 214, 218 are illustrated to have substantially perpendicular polarization directions.

Figure 3:
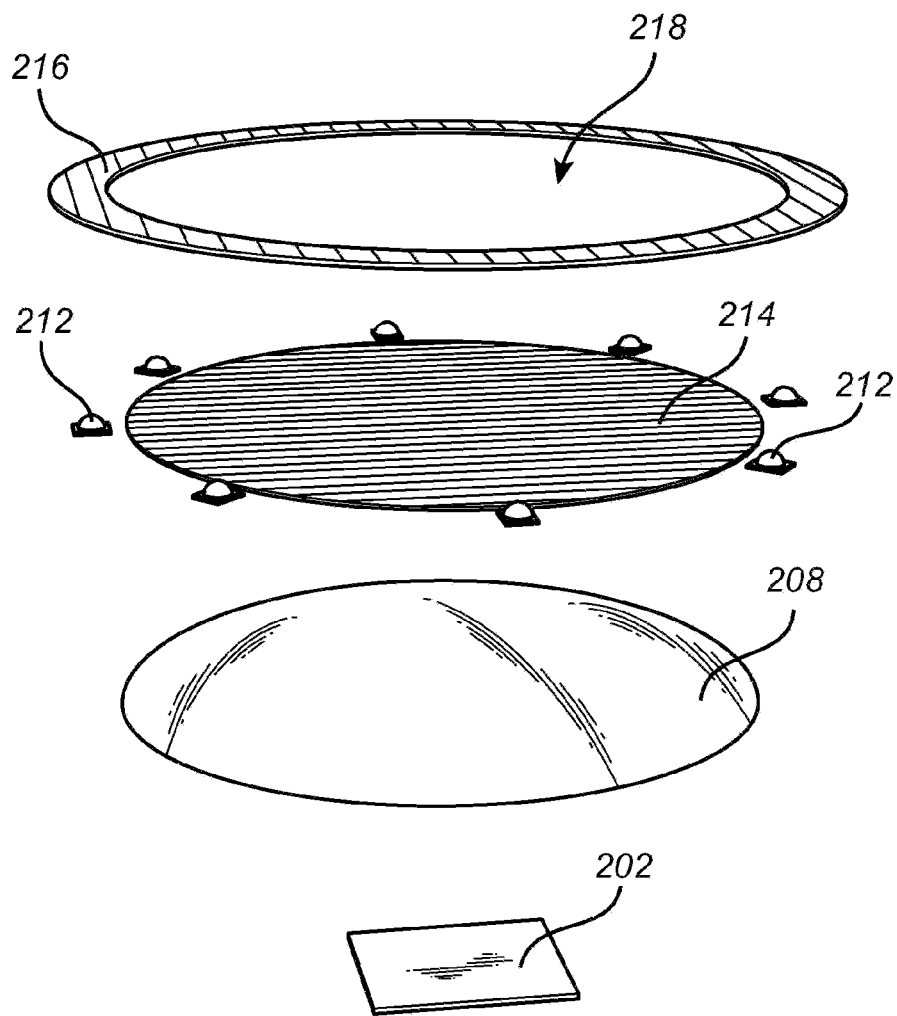
FIG. 3 schematically illustrates an example implementation of an optical biometric imaging device.

FIG. 3 is an exploded view of an example embodiment of the biometric imaging device where the first linear polarizer 214 is arranged above the lens 208 and where the light source is provided in the form of a plurality of light emitting diodes 212 arranged in a ring formation around the lens 208. The lens may be configured in any way that is suitable for a given implementation and it may for example be a freeform lens, or there may be a plurality of coaxially arranged lenses providing the desired optical functionality. Accordingly, the general principles and functionality of the described polarizers can be achieved for many different types of lens arrangements.

Figure 4:
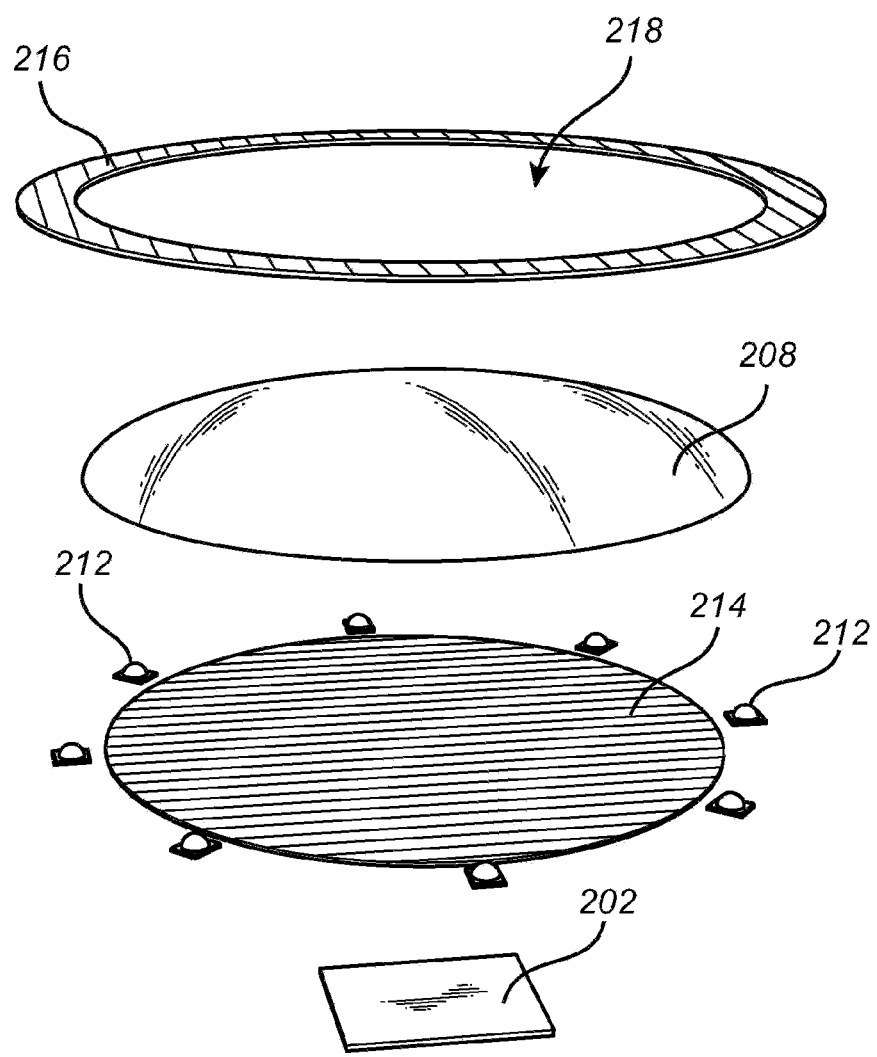
FIG. 4 schematically illustrates an example implementation of an optical biometric imaging device.

In FIG. 4, the first linear polarizer 214 is arranged between the lens 208 and the image sensor. The polarizing effect is the same as if the first linear polarizer 214 is arranged above the lens as illustrated in FIG. 2, and where to place the first linear polarizer 214 can be determined based on what is convenient.

Figure 5:
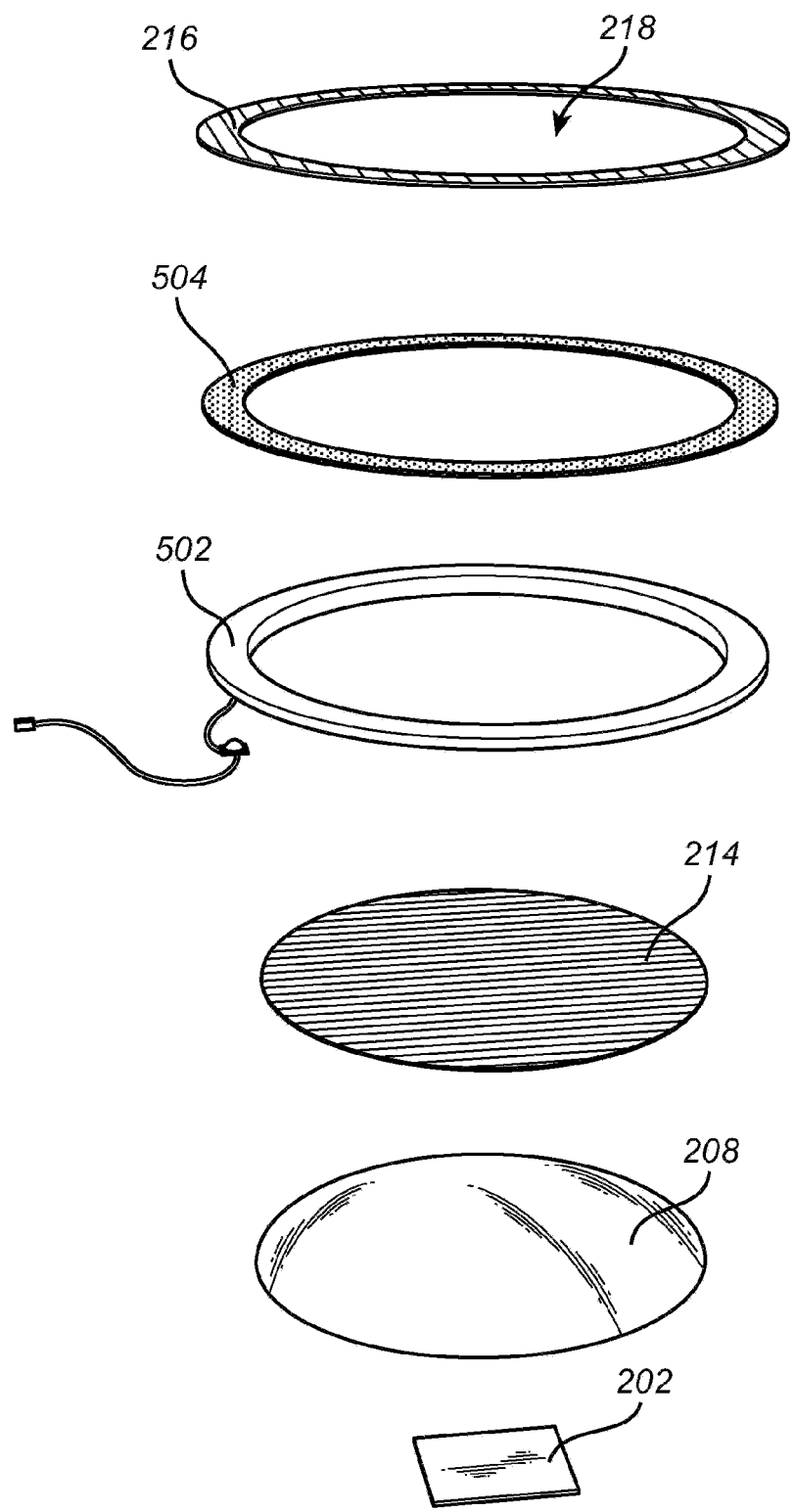
FIG. 5 schematically illustrates an optical biometric imaging device according to an embodiment of the invention.

FIG. 5 schematically illustrates an example embodiment where the light source comprises a waveguide 502 configured to provide vertical decoupling of light. The illustrated waveguide is a circular waveguide 502 arranged around the lens assembly, e.g. on the lens barrel, and it further comprises a vertical diffuser 504 configured to provide vertical decoupling of light. A light source 212 in the form of a light emitting diode or laser is optically coupled to the waveguide 502 to inject light into the waveguide 502. Injected light thereby propagates in the waveguide and is decoupled by the vertical diffuser 504 in a vertical direction towards a biometric object to be imaged.

Figure 6:
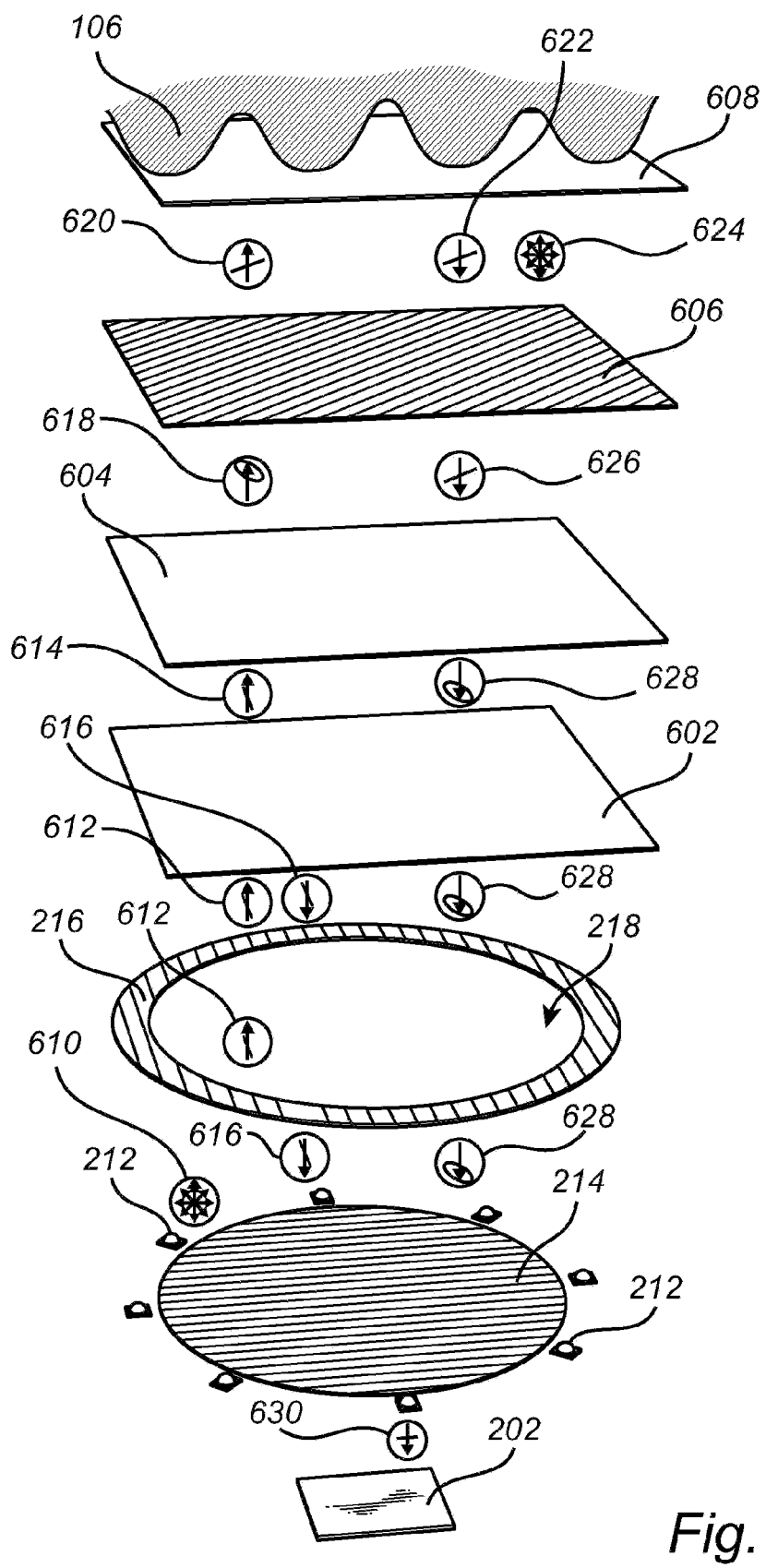
FIG. 6 schematically illustrates an example implementation of an optical biometric imaging device.

FIG. 6 schematically illustrate an optical biometric imaging device located under a display arrangement, for example in a smart phone. The display arrangement panel comprises a display panel 602, a quarter wave plate 604, a linear polarizer plate 606 and a cover glass. The quarter wave plate 604 and a linear polarizer plate 606 is commonly used in OLED panels to reduce internal reflections.

Arrows are included to indicate the propagation direction and polarization of light. The light source 212 emits unpolarized light 610, i.e. light having random polarization, towards the second linear polarizer 216 where the light becomes linearly polarized 612 when passing through the polarizer 216. Thereby, linearly polarized light 612 reaches the display panel 602 where it is in part transmitted 614 and in part reflected 616. The reflected light 616 pass through the opening 218 of the second linear polarizer 216 to reach the first linear polarizer 214 where it is subsequently blocked since the polarization direction of the first linear polarizer 214 is substantially perpendicular to the polarization direction of the second linear polarizer 216. It should be noted that in general polarization filters may allow for a certain amount of light of other polarizations to pass, and that the present description outlines the general properties and functionality of polarizers.

The portion of light being transmitted through the display panel 602 subsequently reaches the quarter wave plate where it becomes circularly polarized 618 upon transmission. Next, the light passes the linear polarizer plate 606 and the linearly polarized light 620 is reflected by the finger 106 placed on the cover glass.

In addition to the reflected linearly polarized light 622, there is also ambient light 624 passing through the cover glass 608. The reflected linearly polarized light 622 pass through the linear polarizer 606 whereas the ambient light 624 is at least partially blocked. Accordingly, the light 626 that have passed through the linear polarizer plate 606 consist both of light emitted by the light source 212 and of ambient light. Returning the same way, the light becomes circularly polarized 628 when passing the quarter wave plate, passes through the display panel largely unaffected in terms of polarization and further on trough the opening 218 of the second linear polarizer 216 to reach the first linear polarizer 214. A portion of the circularly polarized light 628 will pass through first liner polarizer 214 to reach the image sensor 202 as linearly polarized light 630 where an image of the finger 106 can be formed.

In short, the described biometric imaging device prevents light being reflected directly by the display panel from reaching the image sensor while allowing the light reflected by a finger to reach the image sensor, thereby improving the signal-to-noise ratio in the captured image.

Figure 7:
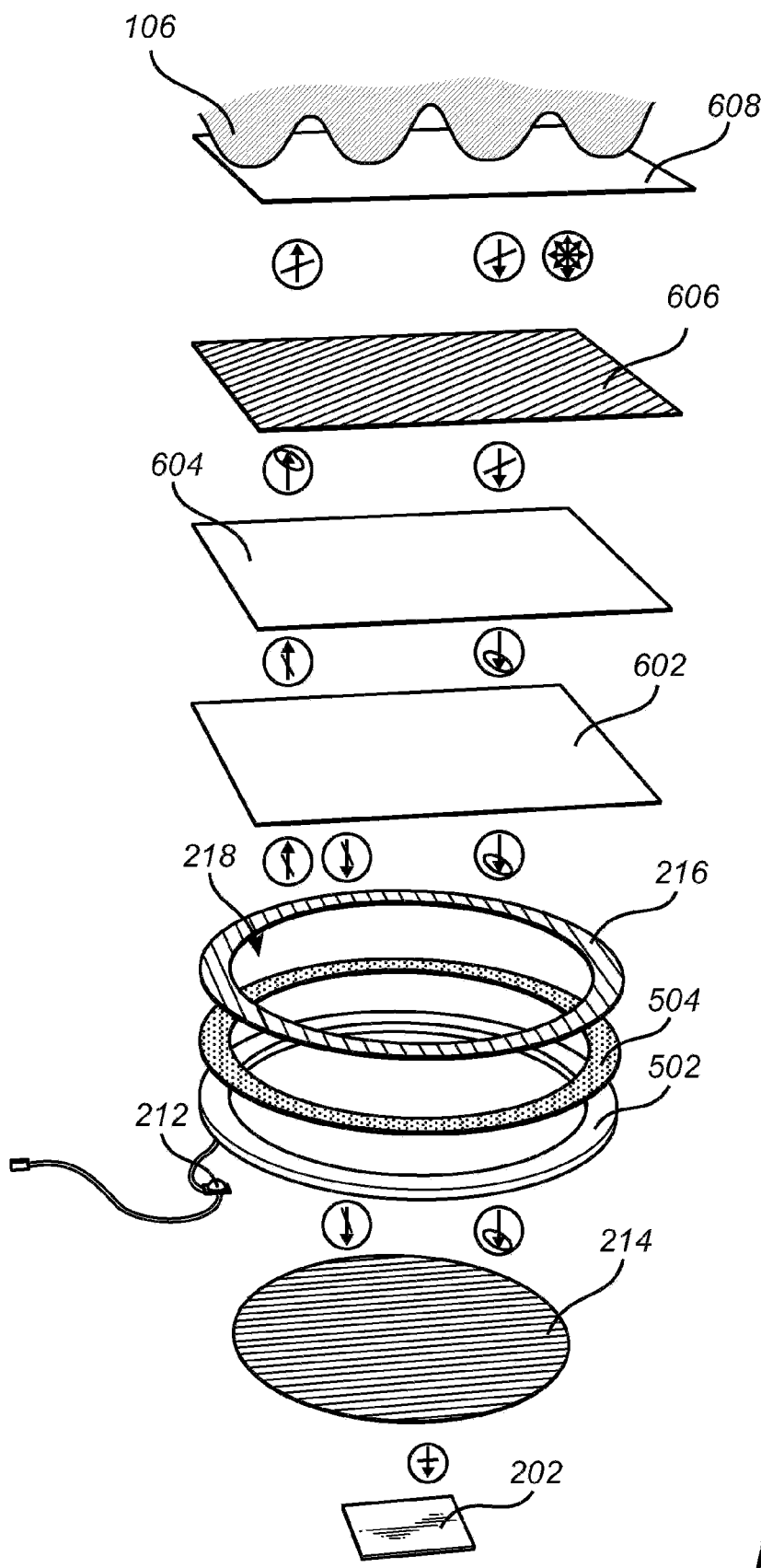
FIG. 7 schematically illustrates an optical biometric imaging device according to an embodiment of the invention.

FIG. 7 illustrates an optical biometric imaging device comprising the circular waveguide 502 illustrated in FIG. 5. The light propagation properties are the same as described with reference to FIG. 6.

Figure 8:
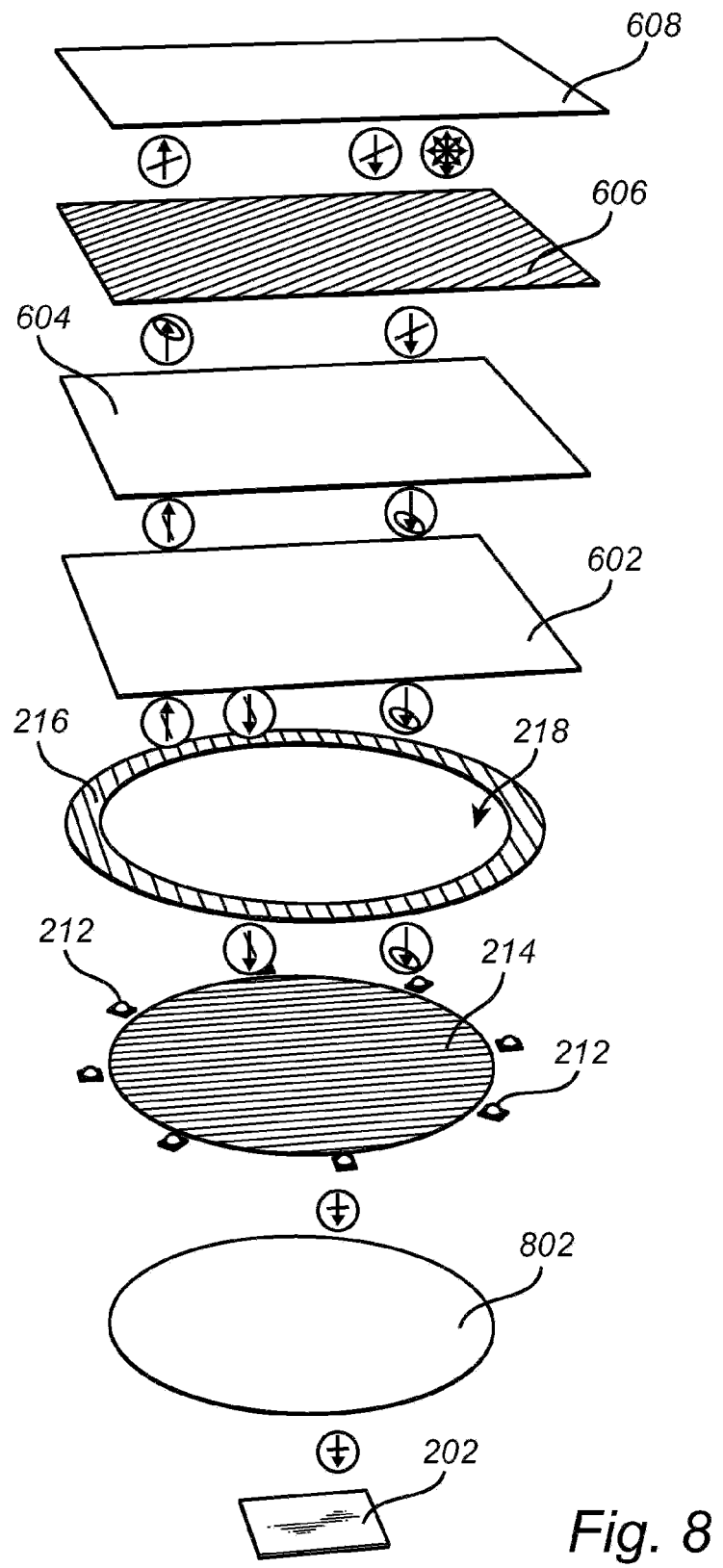
FIG. 8 schematically illustrates an example implementation of an optical biometric imaging device.

FIG. 8 illustrates an example embodiment of the optical biometric imaging device further comprising a filter 802 configured to block visible light. The filter 802 configured to block visible light is advantageously used in an implementation where the light source 212 is configured to emit infrared light such the filter would allow the infrared light to pass while blocking visible light, thereby preventing ambient light from reaching the image sensor 202. The filter 802 may for example be a bandpass filter having a central wavelength around 940 nm, or at another wavelength adapted to the infrared light source.

The filter 802 is here illustrated as being located between the first linear polarizer 214 and the image sensor 202. The filter 802 may for example be laminated together with first linear polarizer 214. In general, the filter 802 may be arranged anywhere between the sensing surface of the imaging device and the image sensor 202. However, when the biometric imaging device is integrated with a display panel, the filter 802 cannot be located where it blocks the emission of visible light from the display panel.

In all of the described embodiments, one or both of the first and second linear polarizer may be rotatable so that the resulting image properties can be optimized. The rotation may be achieved by arranging the polarizer in a threaded connection or in a slit where the polarizer can be rotated. Moreover, it may be sufficient if the polarizer is rotatable during assembly of the imaging device or during integration of the imaging device with a display panel so that image optimization can be performed for any given display. Even if the display type is the same, polarization properties may vary between different manufacturers and different display models. However, it should be noted an advantageous effect would be achieved also with fixed polarizers having a nearly perpendicular polarization direction, even if the fine-tuning required to optimize to the imaging properties could not be performed with fixed polarizers. In particular, in the described embodiments, fixed and perpendicular polarizers would still reduce the amount of light reflected at the display panel reaching the image sensor.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical biometric imaging device for imaging a biometric object comprising:
   an image sensor comprising a plurality of photodetector pixels;
   a lens assembly comprising at least one lens configured to focus light reflected by a biometric object onto the image sensor;
   at least one light source arranged adjacent to the lens assembly and configured to emit light towards a sensing surface of the biometric imaging device, wherein the at least one light source comprises a waveguide configured to provide vertical decoupling of light;
   a first linear polarizer arranged between the light source and the image sensor; and a ring-shaped second linear polarizer arranged over the at least one light source to polarize light emitted by the light source in a direction away from the image sensor and having an opening configured to allow light reflected by a biometric object to reach the lens without being filtered by the second linear polarizer, wherein at least one of the first and second polarizer is rotatable.

2. The optical biometric imaging device according to claim 1, where the ring-shaped second linear polarizer has an opening having a size corresponding to a size of the at least one lens.

3. The optical biometric imaging device according to claim 1, wherein the first linear polarizer is arranged to have polarization direction substantially perpendicular to a polarization direction of the second linear polarizer.

4. The optical biometric imaging device according to claim 1, wherein the first linear polarizer is arranged between the lens and the image sensor.

5. The optical biometric imaging device according to claim 1, wherein the first linear polarizer is arranged between the lens and the second linear polarizer, wherein the at least one light source is arranged so that light emitted in a direction away from the image sensor does not pass through the first linear polarizer.

6. The optical biometric imaging device according to claim 1, wherein the light source is configured to emit light in the infrared wavelength range.

7. The optical biometric imaging device according to claim 6, further comprising a filter configured to block visible light, the filter being arranged between a sensing surface of the imaging device and the image sensor.

8. The optical biometric imaging device according to claim 7, wherein the filter configured to block visible light is integrated with the first linear polarizer.

9. The optical biometric imaging device according to claim 1, wherein the at least one light source comprises a plurality of light emitting diodes, LEDs.

10. The optical biometric imaging device according to claim 1, wherein the at least one light source is a ring-shaped light-source.

11. The optical biometric imaging device according to claim 1, wherein the waveguide comprises a vertical diffuser configured to provide vertical decoupling of light.

12. The optical biometric imaging device according to claim 1, wherein the waveguide is a circular waveguide arranged around the lens assembly.

13. The optical biometric imaging device according to claim 1, wherein the lens assembly comprises a circular lens arranged in a lens barrel.

14. The optical biometric imaging device according to claim 13, wherein the ring-shaped second linear polarizer is arranged on the lens barrel.

15. The optical biometric imaging device according to claim 14, wherein the at least one light source is arranged on the lens barrel.

16. A display arrangement comprising a biometric imaging device according to claim 1, wherein the display arrangement further comprises, in order from the biometric imaging device:
    a display panel;
    a quarter wave plate;
    a linear polarizer plate; and
    a cover-glass.

17. An optical biometric imaging device for imaging a biometric object comprising:
    an image sensor comprising a plurality of photodetector pixels;
    a lens assembly comprising at least one lens configured to focus light reflected by a biometric object onto the image sensor;
    a ring-shaped light source comprising a waveguide configured to provide vertical decoupling of light arranged around the lens assembly and configured to emit light towards a sensing surface of the biometric imaging device;
    a first linear polarizer arranged between the light source and the image sensor; and
    a ring-shaped second linear polarizer arranged over the at least one light source to polarize light emitted by the light source in a direction away from the image sensor and having an opening configured to allow light reflected by a biometric object to reach the lens without being filtered by the second linear polarizer, wherein the first linear polarizer is arranged to have a polarization direction substantially perpendicular to a polarization direction of the second linear polarizer.

* * * * *